March 31, 1942.   A. H. LAUDER   2,278,179
SYNCHRONOUS MOTOR CONTROL SYSTEM
Filed March 30, 1939   2 Sheets-Sheet 2

Inventor:
Arthur H. Lauder,
by Harry E. Dunham
His Attorney.

Patented Mar. 31, 1942

2,278,179

UNITED STATES PATENT OFFICE 2,278,179

SYNCHRONOUS MOTOR CONTROL SYSTEM

Arthur H. Lauder, Schenectady, N. Y., assignor to General Electric Company, a corporation of New York Application March 30, 1939, Serial No. 264,888

26 Claims. (Cl. 172—289)

My invention relates to control systems for synchronous machines and particularly to systems for controlling the application of excitation to a synchronous machine when it is operating subsynchronously without any field excitation and for controlling the removal of excitation when the machine falls out of step.

One object of my invention is to provide an arrangement of apparatus for effecting the application of excitation to a subsynchronously operating synchronous machine in response to the modulated current flowing through a pilot alternator driven by the synchronous machine and connected to the alternating supply circuit supplying current to the machine.

Another object of my invention is to provide an arrangement of apparatus for effecting, when a synchronous machine falls out of step, the removal of excitation from the machine in response to the modulated current flowing through a pilot alternator driven by the machine and connected to the alternating current supply circuit.

A further object of my invention is to provide an arrangement of apparatus whereby the application and removal of excitation to and from a synchronous machine may be effected by a single relay in response to the modulated current flowing through a pilot alternator driven by the machine and connected to the alternating current source to which the synchronous machine is connected.

Other objects of my invention will appear and my invention will be better understood from the following description when taken in connection with the accompanying drawings, and the scope of my invention will be pointed out in the appended claims.

Figure 1:
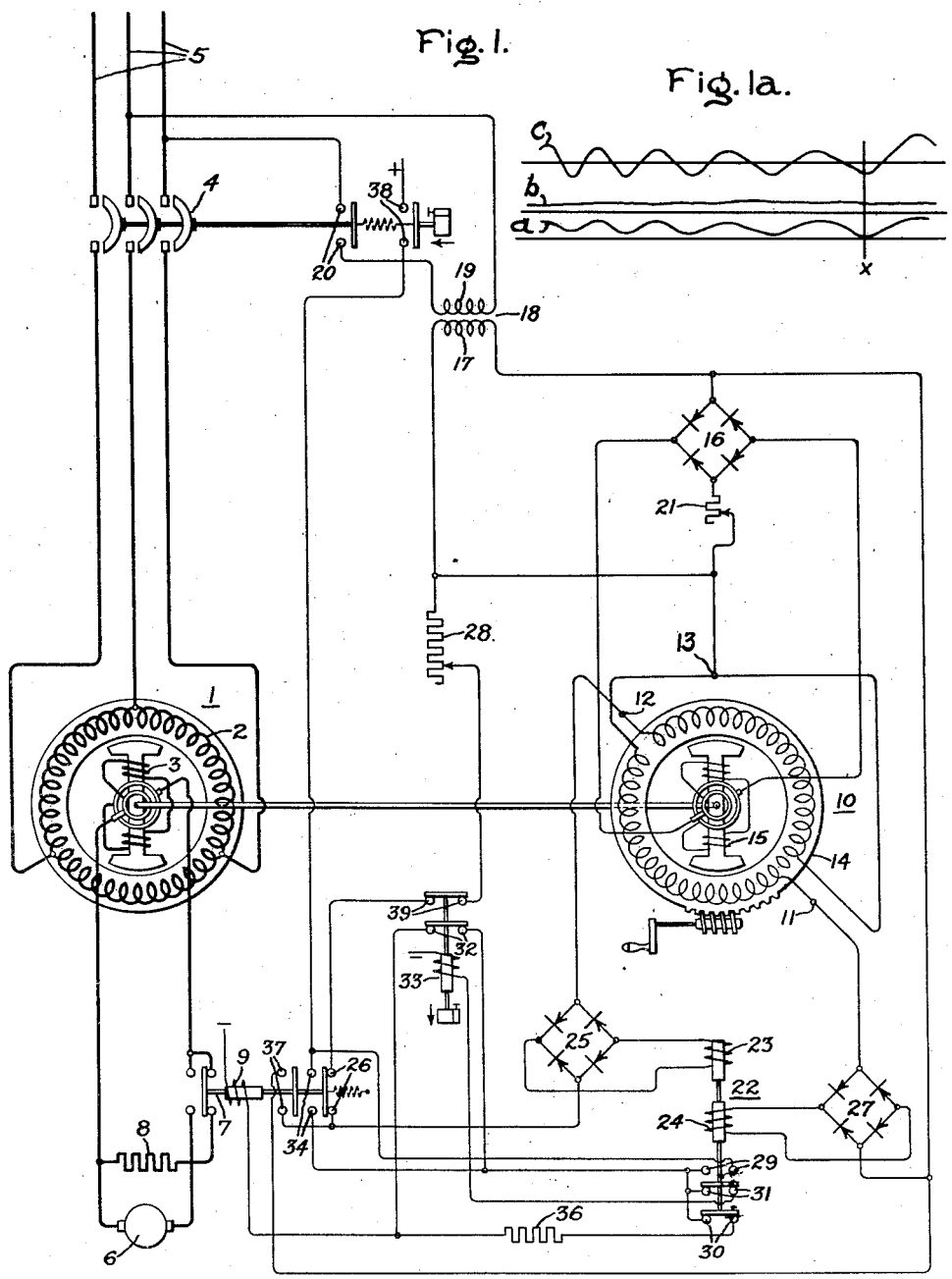
Figure 2:
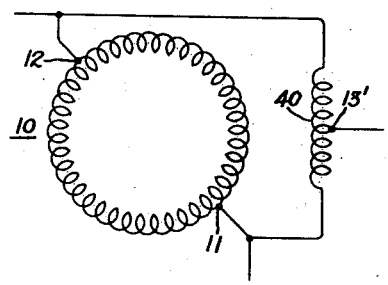
Figure 3:
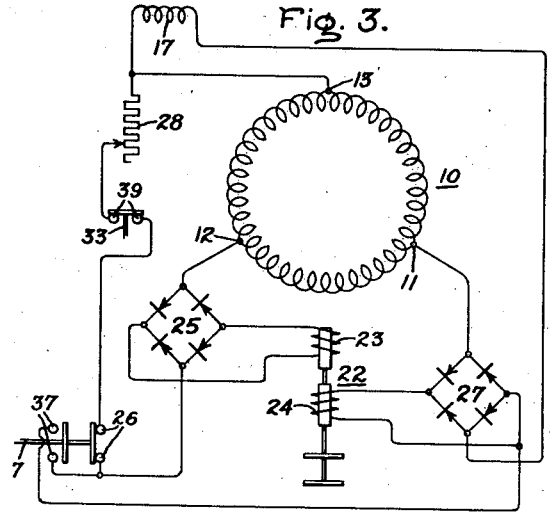
Figure 4:
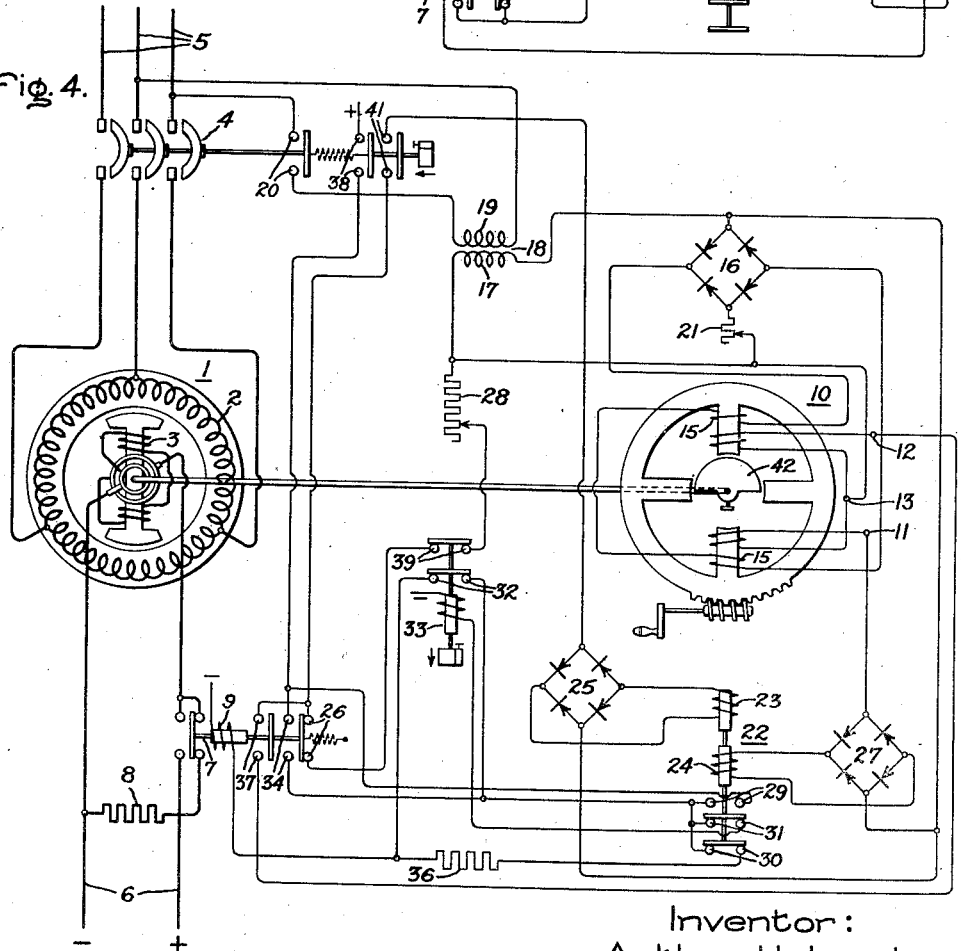

In the accompanying drawings, Fig. 1 diagrammatically illustrates a synchronous motor starting system embodying my invention, Fig. 1a comprises a plurality of explanatory curves showing how the current varies in certain of the circuits of the system shown in Fig. 1 as the motor approaches synchronous speed while accelerating as an induction motor, Figs. 2 and 3 illustrate various modifications of certain of the devices which may be substituted in the embodiment shown in Fig. 1, and Fig. 4 diagrammatically illustrates another embodiment of my invention.

Referring to Fig. 1, 1 represents a synchronous motor having an armature winding 2 and a field winding 3. The armature winding 2 is arranged to be connected by means of a suitable switch 4 to an alternating current supply circuit 5. While I have shown a manually controlled switch 4, it is obvious that any suitable automatic means may be employed for effecting the opening and closing of the switch 4. The field winding 3 is arranged to be connected to a suitable source of excitation 6 by means of a field switch 7. This field switch 7, when open, is arranged to connect suitable impedance means, such as a discharge resistor 8, across the terminals of the field winding 3. The field switch 7 is provided with an operating winding 9 which, when energized, moves the switch 7 from the position in which it is shown to its other position in which the source of excitation 6 is connected to the field winding 3.

For controlling the opening and closing of the field switch 7, I provide, in accordance with my invention, an arrangement which depends for its operation on the magnitude of the modulated current flowing through a pilot generator 10 which is driven in any suitable manner so that the speed thereof is proportional to the speed of the motor 1 and which is connected to the supply circuit 5. As shown in Fig. 1 of the drawings, the pilot generator 10 is a single phase generator having two main alternating current terminals 11 and 12 and an intermediate terminal 13 so located that the voltages between the terminals 12 and 13 and between the terminals 13 and 11 are substantially equal and in phase. In order that the voltages between the terminals 11, 12 and 13 may be varied in phase with respect to the voltage of the supply circuit 5, the stator 14 of the generator 10 is rotatably mounted on its foundation in any suitable manner. Any other suitable phase shifting arrangement, examples of which are well known in the art, may be provided for varying the phase relation between the voltages of the pilot generator 10 and the supply circuit 5. Since the terminal voltages of the generator 10 vary with the speed and position of the rotor of the motor 1, it is evident that the modulated current through the generator 10 varies with the speed and position of the rotor of motor 1.

The pilot generator 10 is provided with a field winding 15 which, in series with a full wave rectifier 16, is connected to the secondary winding 17 of a potential transformer 18, the primary winding 19 of which is arranged to be connected across one phase of the supply circuit 5 by the auxiliary contacts 20 of the switch 4 when it is closed. A rheostat 21 is connected in series with the field winding 15 so that the amount of direct current flowing through the winding 15 may be readily adjusted to any desired value. Any other suitable means, examples of which are well known in the art, may be provided for supplying excitation to the pilot generator field winding 15.

For effecting the closing of the field switch 7 when the motor 1 is operating subsynchronously at a predetermined speed as an induction motor, I provide a control relay 22 having two opposed torque-producing elements respectively producing torques proportional to the voltage between the terminals 12 and 13 of the pilot generator and the vectorial sum of the secondary voltage of the transformer 18 and the voltage between the terminals 11 and 13. As shown in the drawings, the relay 22 is a differential relay having a winding 23 which, in series with an adjustable rheostat 28 and a full wave rectifier 25, is connected across the terminals 12 and 13 of the pilot generator 10 by the auxiliary contacts 26 of the field switch 7 when it is open and an opposing winding 24 which, by means of a full wave rectifier 27, is connected in a series circuit including the secondary winding 17 of the potential transformer 18 and the terminals 11 and 13 of the pilot generator 10. Therefore, during the starting operation of the motor, the energization of the winding 23 varies with the voltage across the terminals 12 and 13 which in turn varies almost directly with the speed of the motor 1 whereas the energization of the winding 24 varies with the vectorial sum of the voltage between the terminals 11 and 13 and the voltage across the secondary winding 17, and therefore varies with the magnitude of the modulated current flowing through the terminals 11 and 13 of the generator 10.

Until the motor 1 reaches a predetermined speed, the torque exerted by the winding 23 remains below the minimum torque exerted by the winding 24 during each slip cycle. When, however, the motor 1 reaches this predetermined speed, which preferably is the maximum induction motor speed to which the motor can accelerate when driving its maximum load, the voltages across the terminals 12 and 13 and the terminals 13 and 11 of the pilot generator 10 are sufficiently high to cause the torque exerted by the winding 23 to exceed the minimum torque exerted during each slip cycle by the winding 24 sufficiently to effect the operation of the relay 22. Therefore, the relay 22 does not operate to close its contacts 29 and open its contacts 30 and 31 until the motor reaches a predetermined speed and, furthermore, operates at this predetermined speed only when the angular relationship between the supply circuit voltage and the voltage between the terminals 11 and 13 is such that the torque exerted by the winding 24 is at the minimum value occurring during each slip cycle at this predetermined speed. This operation may be more clearly understood from the curves a, b and c as shown in Fig. 1a. Curve a shows how the current through the winding 24 of relay 22 varies in magnitude and frequency as the motor speed approaches synchronous speed while the motor is accelerating as an induction motor. Curve b shows how the current through the winding 23 of relay 22 increases in magnitude, and curve c shows how the induced current flowing through the field winding 3 varies in frequency under similar speed conditions of the motor. From these curves it will be seen that, as the terminal voltages of the pilot generator 10 increase, due to the motor speed increasing, the rectified modulated current through the winding 24 pulsates at slip frequency and the minimum value of current occurring during each slip cycle decreases with a decrease in slip whereas the rectified current through the winding 23 gradually increases as the slip decreases so that, when the motor speed has increased to a predetermined subsynchronous value, such as $x$ in Fig. 1a, the torque exerted by winding 23 exceeds the torque exerted by winding 24 by a sufficient amount to operate the relay 22. The point in the slip cycle on the induced field current curve c at which the minimum current occurs during each slip cycle of the current through the winding 24 depends upon the phase relation between the voltage of the supply circuit 5 and the voltage across the terminals 11 and 13 of the pilot generator 10. Therefore, by properly adjusting the position of the stator 14 of the pilot generator 10 the relay 22 can be made to pick up at the desired predetermined motor speed only at that point in the slip cycle which will effect the closing of the field switch 7 at the optimum point for synchronizing the motor 1. The point at which the relay 22 operates is ahead of the optimum point in the slip cycle by an amount dependent upon the operating time of the field switch 7.

Since voltage variations in the supply circuit 5 produce similar variations in the excitation and voltage of the pilot generator 10 and in the currents through the windings 23 and 24 of relay 22, the speed at which the relay 22 operates to initiate the closing operation of the field switch 7 does not vary due to variations in the supply circuit voltage.

Preferably the differential relay 22 is of the type which requires an appreciable unbalance in the torques produced by the windings 23 and 24 in order to actuate the relay from one position to the other. Therefore, when the relay 22 closes its contacts 29, they remain closed long enough to effect the closing of the field switch 7.

By closing its contacts 29, relay 22 completes through contacts 32 of an associated time relay 33 an energizing circuit for the closing coil 9 of the field switch 7. By closing its auxiliary contacts 34, the field switch 7 completes a locking circuit for the closing coil 9.

In order that the relay 22 may also effect the opening of the field switch 7 when the motor 1 falls out of step, I change the connections of the relay 22 in response to the closing of the field switch 7 so that the relay is restored to its normal position and remains in that position until the motor is pulled out of step and causes the torque exerted by the winding 23 to increase to a sufficient value to operate the relay 22. Since the optimum angular displacement between the motor armature flux and field poles at which to close the field switch 7 is substantially the same as the no-load angular displacement, and the relay 22 operates at a predetermined angular displacement, whereas increases in load produce angular displacements in the other direction from the no-load angular displacement, it will be seen that the angular displacement at which the relay 22 operates to effect the closing of the field switch 7 is quite different from the angular displacement of the motor when operating in step and driving a heavy load. Due to this change in angular displacement which occurs during the synchronizing operation, the torque exerted by the winding 24 increases to a sufficient value, after the closing operation of the field switch 7 has been initiated, to restore the relay to its normal position when the motor synchronizes. The restoration of relay 22 to its normal position completes an energizing circuit for the relay 33 which opens the original energizing and holding circuits of the closing coil 9 of the field switch 7. The closing of the contacts 30 of the relay 22, however, completes through a resistor 36 a second holding circuit for the closing coil 9 before the relay 33 opens its contacts 32 in the original energizing and holding circuits of the closing coil 9.

By opening its auxiliary contacts 26 and closing its auxiliary contacts 37, the field switch 7 changes the connections of the winding 23 and the associated full-wave rectifier 25 so that they are connected in series in a circuit including the secondary winding 17 of the transformer 18 and the terminals 12 and 13 of the pilot generator 10. The winding 23, therefore, is energized by a current which depends upon the vector sum of the voltages between the terminals 12 and 13 and the secondary voltage of the transformer 18 and the winding 24 is energized by a current which depends upon the vector sum of the voltages between the terminals 13 and 11 and the secondary voltage of the transformer 18. The connections are so arranged that when the motor is running in synchronism and carrying its full load, the secondary voltage of the transformer 18 and the voltage across the terminals 13 and 11 are substantially in phase whereas the secondary voltage of the transformer 18 and the voltage across the terminals 12 and 13 are substantially in phase opposition. Therefore, when the motor is carrying its full load the current in the winding 24 has almost reached its maximum modulated value and the current in the winding 23 has almost reached its minimum modulated value. When the load on the motor is below full load the smaller current flows through the winding 24 and a larger current flows through the winding 23 than under full load condition. However, the current through winding 24 under light load conditions is such that the torque exerted by the winding 24 always predominates and maintains the relay in its normal position. When the motor pulls out of step, the current through the winding 24 increases to its maximum value and then approaches its minimum value, and at the same time the current through the winding 23 decreases to its minimum value and then approaches its maximum value. At a predetermined displacement angle between the armature flux and the field poles of the motor 1 the torque exerted by the winding 23 predominates sufficiently to cause the relay 22 to close its contacts 29 and open its contacts 30 and 31 thereby effecting the deenergization of the closing coil 9 so that the field switch 7 opens to disconnect the source of excitation 6 from the motor field winding 3.

The operation of the embodiment of my invention shown in Fig. 1 is as follows:

When it is desired to start the motor 1, the switch 4 is closed so that the armature winding is connected to the alternating current supply circuit 5. The motor 1 then starts and accelerates to a predetermined speed as an induction motor. By closing its auxiliary contacts 20, the switch 4 connects the primary winding 19 of the transformer 18 across one phase of the supply circuit 5 so that at the instant of starting a current flows through the winding 24 to restore the relay 22 to its normal position in case it is not in that position. As the motor speed increases during the starting operation, the voltage across the terminals 12 and 13 increases substantially directly with the speed so that the torque of the winding 23 also increases with the motor speed. Similarly, the voltage between the terminals 13 and 11 increases with the motor speed, and since these terminals are connected in series with the secondary winding 17 of the transformer 18 and the winding 24 of the relay 22, the current through the winding 24 is modulated from a maximum to a minimum and back to the maximum value once during each slip cycle and the amplitude of the modulations increases substantially with the increase in speed.

When the motor 1 reaches a predetermined synchronizing speed, the torque exerted by the winding 23 becomes sufficient to overcome the torque exerted by the winding 24 at the instant when this last-mentioned torque is at its minimum value. The relay 22 then operates to close its contacts 29 and open its contacts 30 and 31. The closing of the contacts 29 of relay 22 completes through contacts 38 of switch 4, which preferably are closed a predetermined time after the switch 4 is closed, and contacts 32 of relay 33 an energizing circuit for the closing coil 9 of the field switch 7 so that the source of excitation 6 is connected to the field winding 3 of the motor 1 to pull the motor into synchronism. The closing of the contacts 34 of the field switch 7 completes a shunt circuit around the contacts 29 in the energizing circuit of the closing coil 9. By opening its contacts 26 the field switch 7 interrupts the original energizing circuit of winding 23 across the terminals 12 and 13, which circuit includes the contacts 39 of relay 33 and the adjustable resistor 28, and by closing its contacts 37 the field switch 7 connects the winding 23 across the terminals 12 and 13 with the secondary winding 17 of the transformer 18 in series.

As long as the motor 1 is in synchronism, the relative positions of the field poles and the rotating armature flux thereof are such that the vectorial sum of the secondary voltage of the transformer 18 and the voltage across the terminals 13 and 11 of the pilot generator 10 is greater than the vectorial sum of the secondary voltage of the transformer 18 and the voltage across the terminals 12 and 13 of the pilot generator 10. Consequently, as soon as the motor 1 synchronizes in response to the closing of the field switch 7, the winding 24 restores the relay 22 to its normal position. By closing its contacts 30 relay 22 completes a locking circuit for the closing coil 9 of the field switch 7 through the resistor 36, contacts 34 of the field switch 7 and the auxiliary contacts 38 of the switch 4. The closing of the contacts 31 of the relay 22 completes an energizing circuit for the relay 33 through the contacts 34 of the field switch 7 and the auxiliary contacts 38 of the switch 4. Relay 33 is of the instantaneous pick-up time delay drop out type so that it opens its contacts 32 and 39 immediately after it is energized but does not close these contacts until a predetermined time after the relay is deenergized.

In case the motor fails to synchronize or pulls out of step, the current in the winding 24 increases to its maximum value and then approaches its minimum value as the displacement angle between the armature flux and the field poles of the motor 1 increases during the first slip cycle out of step. At the same time the current in the winding 23 passes through its minimum value and approaches its maximum value. At a predetermined displacement angle the torque of the winding 23 predominates over the torque of the winding 24 sufficiently to cause the relay 22 to open its contacts 30 and 31 and close its contacts 29. The opening of the contacts 30 interrupts the locking circuit of the closing coil 9 so that the field switch 7 opens and disconnects the source of excitation 6 from the motor field winding 3. The opening of the contacts 31 of the relay 22 interrupts the energizing circuit of the relay 33 which closes its contacts 32 and 39 after a predetermined time interval which is made long enough to allow the machine and the control circuits to become stabilized.

The opening of the field switch 7 and the closing of the contacts 32 and 39 of the relay 33 reestablishes the original synchronizing connections so that, as soon as the motor 1 again reaches the desired synchronizing speed and the proper angular relationship exists between the armature flux and the field poles of the motor 1, the relay 22 operates in the manner heretofore described to reapply excitation to the motor 1 to pull it into step.

From the above description, it will be evident that I have provided a synchronous motor field control arrangement which functions to apply excitation only upon the motor reaching a predetermined speed which is the same regardless of either the amount of load on the motor or variations in the supply circuit voltage and, furthermore, when this predetermined speed has been attained, the closing operation of the field switch is initiated at a predetermined value of displacement angle. Also, if the machine fails to synchronize or pulls out of step, the control arrangement functions to remove excitation at a predetermined angular displacement and to reapply excitation when the machine again reaches the desired synchronizing speed.

Instead of providing the armature winding of the pilot generator 10 with an intermediate terminal 13, the same result may be obtained by connecting a suitable impedance 40 across the main terminals 12 and 11 of the pilot generator, as shown in Fig. 2, and providing this impedance with an intermediate terminal 13' which may be connected in the same manner as the terminal 13 in the embodiment of my invention shown in Fig. 1.

The pilot generator 10, also, may be a polyphase machine, as shown in Fig. 3, instead of a single phase machine 1 with an intermediate terminal 13, as shown in Fig. 1. In this modification of my invention the voltage across the terminals 12 and 13 increases to a sufficient value when the motor 1 reaches a predetermined speed during the starting operation to cause the torque of relay winding 23 to predominate and operate the relay 22 to effect the application of excitation to the motor 1. When the motor is operating in synchronism, the vector sum of the secondary voltage of the transformer 18 and the voltage between the terminals 13 and 11 is greater than the vector sum of the secondary voltage of the transformer 18 and the voltage between the terminals 12 and 13 so that the relay 22 remains in its normal position. When, however, the motor falls out of step, the vector sum of the voltage impressed across the circuit of the relay winding 23 varies inversely with respect to the voltage impressed across the circuit of the relay winding 24 during each slip cycle so that at a predetermined angular displacement between the armature flux and the field poles of the motor 1, the relay operates to remove excitation from the motor 1. After sufficient time has elapsed to permit the time relay 33 to close its contacts 39, the relay 22 can reconnect the source of excitation to the field winding as soon as the motor again reaches the desired synchronizing speed and the proper angular relationship exists between the armature flux and the field poles of the motor 1.

In the embodiment of my invention, shown in Fig. 4, I have shown a pilot generator 10 of the variable reluctance type in which the armature winding and field winding are windings on the stator so that the flux interlinking the windings is varied by a magnetic member 42 driven by the motor. Also the winding 24 of the differential relay 22 and the full-wave rectifier 27 are connected in series with the secondary winding 17 of the transformer 18 and the terminals 13 and 11 of the pilot generator 10 in the same manner as in Fig. 1 so that the current through the relay winding 24 varies in accordance with the vector sum of the secondary voltage of the transformer 18 and the voltage between the terminals 13 and 11 of the generator 10. The winding 23 of the relay 22 and the full-wave rectifier 25, however, instead of being connected across the terminals 12 and 13 of the generator 10 during the induction motor operation of the motor 1, are connected in series across the secondary winding 17 of the transformer 18 so that the current through the winding 23 is proportional to the supply circuit voltage and, therefore, is substantially constant during this operation of the motor. This circuit of the winding 23 and rectifier 25 includes contacts 41 of switch 4, contacts 26 of field switch 7, contacts 39 of relay 33 and adjustable resistor 28. Preferably the contacts 41 are arranged in any suitable manner so that they are not closed until a short interval after the main contacts of the switch 4 close in order to insure that the relay 22 is restored to its normal position by the energization of winding 24 in case it is not in that position at the instant of starting. The current through the winding 23 is adjusted by the resistor 28 so that the torque exerted by the winding 23 is lower than the torque exerted by the winding 24 until the motor 1 reaches the desired synchronizing speed. Then the torque exerted by the winding 23 overcomes the minimum torque exerted by the winding 24 at a predetermined point in the slip cycle so that the relay 22 operates and effects the closing of the field switch 7 to apply excitation to the motor 1 to pull it into step in the same manner as in Fig. 1. The closing of the field switch 7 also changes the connections of the relay winding 23 so that it is connected in series with the secondary winding 17 of the transformer 18 and the terminals 12 and 13 of the pilot generator 10 to render the relay 22 operative to effect in the same manner as in Fig. 1, the opening of the field switch 7 to remove excitation from the field winding 3 when the motor falls out of step. As soon as the relay 33 is restored to its normal position after the field switch 7 opens, the relay 22 can again effect the reclosing of the field switch 7 as soon as the motor again reaches the desired synchronizing speed.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is,

1. An arrangement for controlling the connection between a source of excitation and the field winding of a synchronous machine connected to an alternating current circuit comprising a generator driven by said machine and connected to said circuit so that a modulated current flows through said circuit when said machine is operating out of step, and electromagnetic means responsive to the modulated current flowing through said generator when said machine is operating out of step for controlling the connection between said source of excitation and the field winding of said machine.

2. An arrangement for controlling the connection between a source of excitation and the field winding of a synchronous machine connected to an alternating current circuit comprising a generator driven by said machine and connected to said circuit so that a modulated current flows through said circuit when said machine is operating out of step, means for connecting said source of excitation to said field winding, and electromagnetic means responsive to a modulated current of a predetermined magnitude flowing through said generator for effecting the operation of said connecting means.

3. An arrangement for controlling the disconnection of a source of excitation from the field winding of a synchronous machine connected to an alternating current circuit comprising a generator driven by said machine and connected to said circuit so that a modulated current flows through said circuit when said machine is operating out of step, means for disconnecting said source of excitation from said field winding, and means responsive to the modulated current flowing through said generator when said machine falls out of step for effecting the operation of said disconnecting means.

4. An arrangement for controlling the disconnection of a source of excitation from the field winding of a synchronous machine connected to an alternating current circuit comprising a generator driven by said machine and connected to said circuit, means for disconnecting said source of excitation from said field winding, and means energized in accordance with the vectorial sum of the voltages of said generator and said circuit for effecting the operation of said disconnecting means when said machine falls out of step.

5. An arrangement for controlling the connection between a source of excitation and the field winding of a synchronous machine connected to an alternating current circuit comprising means for connecting said source to said field winding, a generator driven by said machine and connected to said circuit so that a modulated current flows through said circuit when said machine is operating out of step, a relay having a winding energized in accordance to the magnitude of the modulated current flowing through said generator, means for compensating said relay for changes in the voltage of said circuit, and means controlled by said relay for effecting the operation of said connecting means.

6. An arrangement for controlling the connection between a source of excitation and the field winding of a synchronous machine connected to an alternating current circuit comprising means for connecting said source to said field winding, a generator driven by said machine and connected to said circuit, a relay having a winding energized in accordance with the vectorial sum of the voltages of said generator and circuit, means for compensating said relay for changes in the voltage of said circuit, and means controlled by said relay for effecting the operation of said connecting means.

7. In combination, a synchronous machine connected to a source of alternating current, a field winding for said machine, a source of excitation for the field winding of said machine, a field switch for connecting said source of excitation to said field winding, a pilot generator driven by said machine, and means responsive to a predetermined relation between the voltages of said generator and alternating current source for effecting the closing of said field switch and responsive to a different predetermined relation between the said voltages for effecting the opening of said field switch.

8. In combination, a synchronous machine connected to a source of alternating current, a field winding for said machine, a source of excitation for the field winding of said machine, a field switch for connecting said source of excitation to said field winding, a pilot generator driven by said machine, a differential relay having two torque producing elements, means for energizing one of said elements so that the torque produced thereby varies with the vectorial sum of the voltages of said generator and said alternating current source, means for energizing the other of said elements so that the torque produced thereby varies with the speed of said machine, and means controlled by said relay for effecting a predetermined operation of said field switch.

9. In combination, a synchronous machine connected to a source of alternating current, a field winding for said machine, a source of excitation for the field winding of said machine, a field switch for connecting said source of excitation to said field winding, a pilot generator driven by said machine, a differential relay having two torque producing elements, means for energizing one of said elements so that the torque produced thereby varies with the vectorial sum of the voltages of said generator and said alternating current source, means for energizing the other of said elements so that the torque produced thereby varies with the voltage of said machine, and means controlled by said relay for effecting a predetermined operation of said field switch.

10. In combination, a synchronous machine connected to a source of alternating current, a field winding for said machine, a source of excitation for the field winding of said machine, a field switch for connecting said source of excitation to said field winding, a pilot generator driven by said machine, a differential relay having two torque producing elements, means for energizing one of said elements so that the torque produced thereby varies with the vectorial sum of the voltages of said generator and said alternating current source, means for energizing the other of said elements so that the torque produced thereby varies with the voltage of said alternating current source, and means controlled by said relay for effecting a predetermined operation of said field switch.

11. In combination, a synchronous machine connected to a source of alternating current, a field winding for said machine, a source of excitation for the field winding of said machine, a field switch for connecting said source of excitation to said field winding, a pilot generator driven by said machine and having a plurality of terminals connected to its armature winding, a differential relay having two torque producing elements, means for energizing one of said elements so that the torque produced thereby varies with the vectorial sum of the voltages between two terminals of said generator and a predetermined voltage of said alternating current source, means for energizing the other of said elements so that the torque produced thereby varies with the vectorial sum of the voltage between two other terminals of said generator and said predetermined voltage of said alternating current source, and means controlled by said relay for effecting a predetermined operation of said field switch.

12. In combination, a synchronous machine connected to an alternating current source, a source of excitation, a field switch, a pilot generator driven by said machine and producing two voltages, a differential relay having two torque producing elements, means for energizing one of said elements so that the torque produced thereby varies in accordance with the vectorial sum of one of the voltages of said generator and a predetermined voltage of said alternating current source, means for energizing the other of said elements so that the torque produced thereby varies with the speed of said machine when said field switch is open and in accordance with the vectorial sum of the other voltage of said generator and said predetermined voltage of said alternating current source when said field switch is closed, and means controlled by said relay for effecting the opening and closing of said field switch.

13. In combination, a synchronous machine connected to an alternating current source, a source of excitation, a field switch, a pilot generator driven by said machine and producing two voltages, a differential relay having two torque producing elements, means for energizing one of said elements so that the torque produced thereby varies in accordance with the vectorial sum of one of the voltages of said generator and a predetermined voltage of said alternating current source, means for energizing the other of said elements so that the torque produced thereby varies with the other voltage of said machine when said field switch is open and in accordance with the vectorial sum of the other voltage of said generator and said predetermined voltage of said alternating current source when said field switch is closed, and means controlled by said relay for effecting the opening and closing of said field switch.

14. In combination, a synchronous machine connected to an alternating current source, a source of excitation, a field switch, a pilot generator driven by said machine and producing two voltages, a differential relay having two torque producing elements, means for energizing one of said elements so that the torque produced thereby varies in accordance with the vectorial sum of one of the voltages of said generator and a predetermined voltage of said alternating current source, means for energizing the other of said elements so that the torque produced thereby depends upon the voltage of said alternating current source when said field switch is open and varies in accordance with the vectorial sum of the other voltage of said generator and said predetermined voltage of said alternating current source when said field switch is closed, and means controlled by said relay for effecting the opening and closing of said field switch.

15. In combination, a synchronous machine connected to an alternating current source, a source of excitation for the field winding of said machine, a field switch, a pilot generator driven by said machine, means for exciting said generator in accordance with the voltage of said alternating current source, a differential relay having two torque producing elements, means for energizing one of said torque producing elements so that the torque produced thereby varies in accordance with the vectorial sum of the voltage of said generator and a predetermined voltage of said alternating current source, means for energizing the other of said elements so that the torque produced thereby varies in accordance with the voltage of said generator, and means controlled by said relay for effecting a predetermined operation of said field switch.

16. In combination, a synchronous machine connected to an alternating current source, a source of excitation for the field winding of said machine, a field switch, a pilot generator driven by said machine, means for exciting said generator in accordance with the voltage of said alternating current source, a differential relay having two torque producing elements, means for energizing one of said torque producing elements with unidirectional current which varies with the vectorial sum of the voltage of said generator and a predetermined voltage of said alternating current source, means for energizing the other of said elements with a unidirectional current which varies with the voltage of said generator, and means controlled by said relay for effecting a predetermined operation of said field switch.

17. In combination, a synchronous machine connected to an alternating current source, a source of excitation for the field winding of said machine, a field switch, a pilot generator driven by said machine, means for exciting said generator in accordance with the voltage of said alternating current source, a differential relay having two torque producing elements, means for energizing one of said torque producing elements with unidirectional current which varies with the vectorial sum of the voltage of said generator and a predetermined voltage of said alternating current source, means for energizing the other of said elements with a unidirectional current which varies with the speed of said generator, and means controlled by said relay for effecting a predetermined operation of said field switch.

18. In combination, a synchronous machine connected to an alternating current source, a source of excitation for the field winding of said machine, a field switch, a pilot generator driven by said machine, means for exciting said generator in accordance with the voltage of said alternating current source, a differential relay having two torque producing elements, means for energizing one of said torque producing elements with unidirectional current which varies with the vectorial sum of the voltage of said generator and a predetermined voltage of said alternating current source, means for energizing the other of said elements with a unidirectional current which varies with the voltage of said alternating current source, and means controlled by said relay for effecting a predetermined operation of said field switch.

19. In combination, a source of alternating current, a synchronous machine connected to said source of alternating current, a pilot generator driven by said machine and connected to said source of alternating current, means responsive to the current flowing between said generator and said source for applying excitation to the field winding of said machine when it is operating at a predetermined speed as an induction motor and for removing excitation from the field winding when the machine pulls out of step, and means for preventing said current responsive means from reapplying excitation for a predetermined time after excitation has been removed.

20. In combination, a source of alternating current, a synchronous machine connected to said source of alternating current, a pilot generator driven by said machine and connected to said source of alternating current, a field switch in the field circuit of said machine, means responsive to the current flowing between said generator and said source for closing said field switch when said switch is open and for opening said switch when said machine pulls out of step, and timing means controlled by the opening of said switch for preventing said current responsive means from effecting a subsequent closing of said switch for a predetermined time.

21. In combination, a source of alternating current, a synchronous machine connected to said source of alternating current, a pilot generator driven by said machine and connected to said source of alternating current, means dependent on the vectorial sum of the voltages of said generator and source for applying excitation to the field winding of said machine, means responsive to said machine falling out of step for effecting the removal of excitation from the field winding of said machine, and means for preventing said voltage dependent means from effecting an application of excitation for a predetermined time after excitation is removed due to said machine falling out of step.

22. In combination, a source of alternating current, a synchronous machine connected to said source of alternating current, a pilot generator driven by said machine and connected to said source of alternating current, a field switch in the field circuit of said machine, means dependent on the vectorial sum of the voltages of said generator and source for closing said field switch when it is open, means responsive to said machine falling out of step for opening said field switch, and means for rendering said voltage dependent means operative to close said switch a predetermined time after said switch is opened in response to said machine falling out of step.

23. An arrangement for controlling the application and removal of excitation to and from the field winding of a synchronous machine connected to an alternating current source comprising an electric circuit energized by said source, means for varying the current in said electric circuit in accordance with the rotor position and speed of said machine, and means controlled by the current in said circuit for effecting the application of excitation to the field winding of said machine when it is operating at any speed above a predetermined speed as an induction motor and for effecting the removal of excitation from said field winding when said machine falls out of step.

24. An arrangement for controlling the application and removal of excitation to and from the field winding of a synchronous machine connected to an alternating current source comprising an electric circuit energized by said source, means for varying the current in said electric circuit in accordance with the rotor position and speed of said machine, means controlled by the current in said circuit for effecting the application of excitation to the field winding of said machine when it is operating at any speed above a predetermined speed as an induction motor and for effecting the removal of excitation from said field winding when said machine falls out of step, and means for preventing said current controlled means from reapplying excitation for a predetermined time after it has effected the removal of excitation due to said machine falling out of step.

25. An arrangement for controlling the application and removal of excitation to and from the field winding of a synchronous machine connected to an alternating current source comprising an electric circuit energized by said source, means for varying the current in said electric circuit in accordance with the rotor position and speed of said machine, means controlled by the current in said circuit for effecting the application of excitation to the field winding of said machine when it is operating at any speed above a predetermined speed as an induction motor, means for removing excitation from the field winding of said machine when it falls out of step, and means for preventing said current controlled means from reapplying excitation for a predetermined time after excitation has been removed due to said machine falling out of step.

26. An arrangement for controlling the application and removal of excitation to and from the field winding of a synchronous machine connected to an alternating current source comprising an electric circuit energized by said source, means for varying the current in said electric circuit in accordance with the rotor position and speed of said machine, means controlled by the current in said circuit for removing excitation from said machine when it falls out of synchronism, means dependent upon the speed of said machine being above a predetermined value for applying excitation to said machine, and means for preventing said speed dependent means from applying excitation for a predetermined time after excitation is removed due to said machine falling out of step.

ARTHUR H. LAUDER.